(12) United States Patent
Chiang (10) Patent No.: US 10,250,846 B2
(45) Date of Patent: Apr. 2, 2019

(54) SYSTEMS AND METHODS FOR IMPROVED VIDEO CALL HANDLING

(71) Applicant: T-Mobile USA, Inc., Bellevue, WA (US)

(72) Inventor: Hsin-Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/387,861

(22) Filed: Dec. 22, 2016

(65) Prior Publication Data

US 2018/0184045 A1    Jun. 28, 2018

(51) Int. Cl.
| | | |
|---|---|---|
| H04M 7/14 | (2006.01) | |
| H04N 7/14 | (2006.01) | |
| G10L 15/26 | (2006.01) | |
| H04W 4/12 | (2009.01) | |
| H04N 21/4788 | (2011.01) | |

(52) U.S. Cl.
CPC ............ H04N 7/147 (2013.01); G10L 15/26 (2013.01); H04W 4/12 (2013.01); H04N 21/4788 (2013.01)

(58) Field of Classification Search
USPC .................. 348/14.01, 14.08; 455/556.1
See application file for complete search history.

(56) References Cited

U.S. PATENT DOCUMENTS

| | | | | |
|---|---|---|---|---|
| 5,774,857 A * | 6/1998 | Newlin | ............... | G09B 21/009 704/200 |
| 6,701,162 B1 * | 3/2004 | Everett | ............. | H04M 1/72591 455/556.1 |
| 9,191,789 B2 * | 11/2015 | Pan | ................... | H04M 3/42391 |
| 2007/0106724 A1 * | 5/2007 | Gorti | ...................... | G06Q 10/10 709/204 |
| 2008/0295040 A1 * | 11/2008 | Crinon | .................. | H04N 7/152 715/865 |
| 2010/0063815 A1 * | 3/2010 | Cloran | .................. | G06Q 10/10 704/235 |
| 2012/0329518 A1 * | 12/2012 | Garg | ................ | H04M 1/72552 455/556.1 |
| 2013/0066623 A1 * | 3/2013 | Chou | ................... | G06F 17/289 704/2 |
| 2013/0169742 A1 * | 7/2013 | Wu | ....................... | H04N 7/152 348/14.08 |
| 2015/0011251 A1 * | 1/2015 | Parker | ..................... | H04W 4/14 455/466 |
| 2015/0120825 A1 * | 4/2015 | Waxman | ............... | H04L 65/403 709/204 |
| 2017/0085506 A1 * | 3/2017 | Gordon | ................. | H04L 51/046 |

* cited by examiner

*Primary Examiner* — Quoc D Tran (74) *Attorney, Agent, or Firm* — Lee & Hayes, P.C.

(57) ABSTRACT

Systems and methods for providing video subtitling and text communications (e.g., real time text (RTT) and conventional text messaging) during video calls. The system can include video calling with voice recognition based subtitles. The system can also include a call log to provide a textual record of the audio portion of the video call. The system can utilize embedded or online (e.g., cloud-based) voice recognition systems to provide the subtitles and call log. The system can enable users to send RTT, standard text, or other messages to multiple users participating in a video call via a public text interface. The system can also enable users to send private RTT, standard text, or other messages to specified participants during video calls using parallel interfaces.

21 Claims, 5 Drawing Sheets

SYSTEMS AND METHODS FOR IMPROVED VIDEO CALL HANDLING

BACKGROUND

Computers, cellular phones, and other electronic devices are ubiquitous. The combination of the Internet, cellular technologies, and modern electronics, among other things, has created an explosion in the number and types of electronic devices available (e.g., cellular phones, smart phones, tablets, laptops, etc.). Users rely on smart phones, for example, for internet access, e-mail, navigation, and even status.

Increasingly, users rely on smart phones, tablets, and other cellular and internet connected devices as their primary method of communication. Business owners, entrepreneurs, and others may use their smart phone, for example, as their business and personal phone. As a result, many users even place video calls from their smart phone, tablet, or other electronic devices.

In some cases, however, users may be temporarily or permanently disabled, in a noisy location, or otherwise unable to hear the audio portion of a video call. Thus, while the user may be able to see the video portion of the call, they may not be able to hear the audio portion of the call or respond verbally. To this end, a video interface that includes additional functionality would be useful.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Examples of the present disclosure relate generally to systems and methods for providing subtitles and alternative communication channels during video calls and video conferencing. The system can enable users to receive subtitles during a video call or video conference using one or more voice recognition systems and methods. The system can also enable the user to review a log of the video call and/or communicate using real time text (RTT), standard text messaging, or other communications methods.

To simplify and clarify explanation, the disclosure is described herein as systems and methods for use with cellular phones. One skilled in the art will recognize, however, that the disclosure is not so limited. While the systems and methods are useful in conjunction with cellular phones and video calling associated therewith, it should be understood that the systems and methods can just as easily be used for other network connected electronic devices, such as tablets, laptops, and personal computers. The system can be used anytime efficient, clear video call handling is desired. The system can provide the user with an enhanced experience and can enhance the user's ability to understand and communicate when making video calls. The term "video call" is used below, but can also refer to video calls between multiple callers, or "video conferences."

The terms "system," "graphical user interface" (or, GUI) and "graphical user interface system" are used herein interchangeably. These terms are used to denote a system that include a GUI and the software and hardware used to implement the GUI and associated functionality. The systems and methods described hereinafter as making up the various elements of the present disclosure are intended to be illustrative and not restrictive. Many suitable systems, methods, and configurations that would perform the same or a similar function as the systems described herein are intended to be embraced within the scope of the disclosure.

As discussed above, users often use a cell phone, tablet, or other network connected electronic device (collectively, user equipment, or UE) to place and receive video calls. As the name implies, video calls can enable one or more participants in a video call to both see and hear each other. Video calls can be carried over internet connections, for example, cellular connections, and even conventional land lines.

There may be times, however, when a user wishes to participate in a video call, but finds it difficult or impossible to hear the audio portion of the call. The user may be in a noisy location, for example, or may be temporarily or permanently hearing disabled. For various reasons, the user may nonetheless wish to participate in the video call. A wounded soldier, for example, may have temporary or permanent hearing damage due to a bomb blast, artillery, or other cause. The soldier may nonetheless wish to contact his family back home using a video call. Seeing that the soldier is alive can provide comfort to the family, for example, despite the fact that the soldier may be unable to hear and/or communicate verbally due to the injury.

In this example, because the soldier may be unable to hear and/or speak, some supplemental means of communication is needed. As mentioned, the soldier may not be able to hear. In addition, due to injuries, for example, the soldier may also not be able to speak (e.g., his head is bandaged). Thus, it would be beneficial to provide a number of additional features to the standard video calling interface.

To this end, examples of the present disclosure can comprise a video calling interface that includes real-time subtitles, a call log, and/or text messaging, among other things. In the soldier's scenario, for example, the soldier can see his family in the video call and read what they are saying —though he cannot hear—in the form of subtitles. The soldier can also communicate via RTT or text message though he cannot speak. The soldier's family, on the other hand, can see the soldier on the video call, speak to him as normal, and receive text messages from the soldier during the call. In the manner, the conversation can take a more normal cadence—with the family speaking and the soldier texting—despite using multiple forms of communication and despite the fact that the soldier might otherwise have difficulty communicating.

Of course, examples of the present disclosure are not so limited. The system can be used as an adjunct to the communication provided by video calling anytime there is a need. In other words, some users may simply not be able to hear the audio from a video call because they are in a noisy location—e.g., they are on a video call while on the subway. Other users may wish to submit questions during a video seminar, for example, without interrupting. Thus, being able to submit a question in real-time, in text form, can enable the user to ask questions relevant to the current discussion, for example, without interrupting the speaker. Still other users on the same video call may wish to communicate with each other via text separately, or privately, from the video call. It is to such systems and methods that examples of present disclosure are primarily directed.

Figure 1:
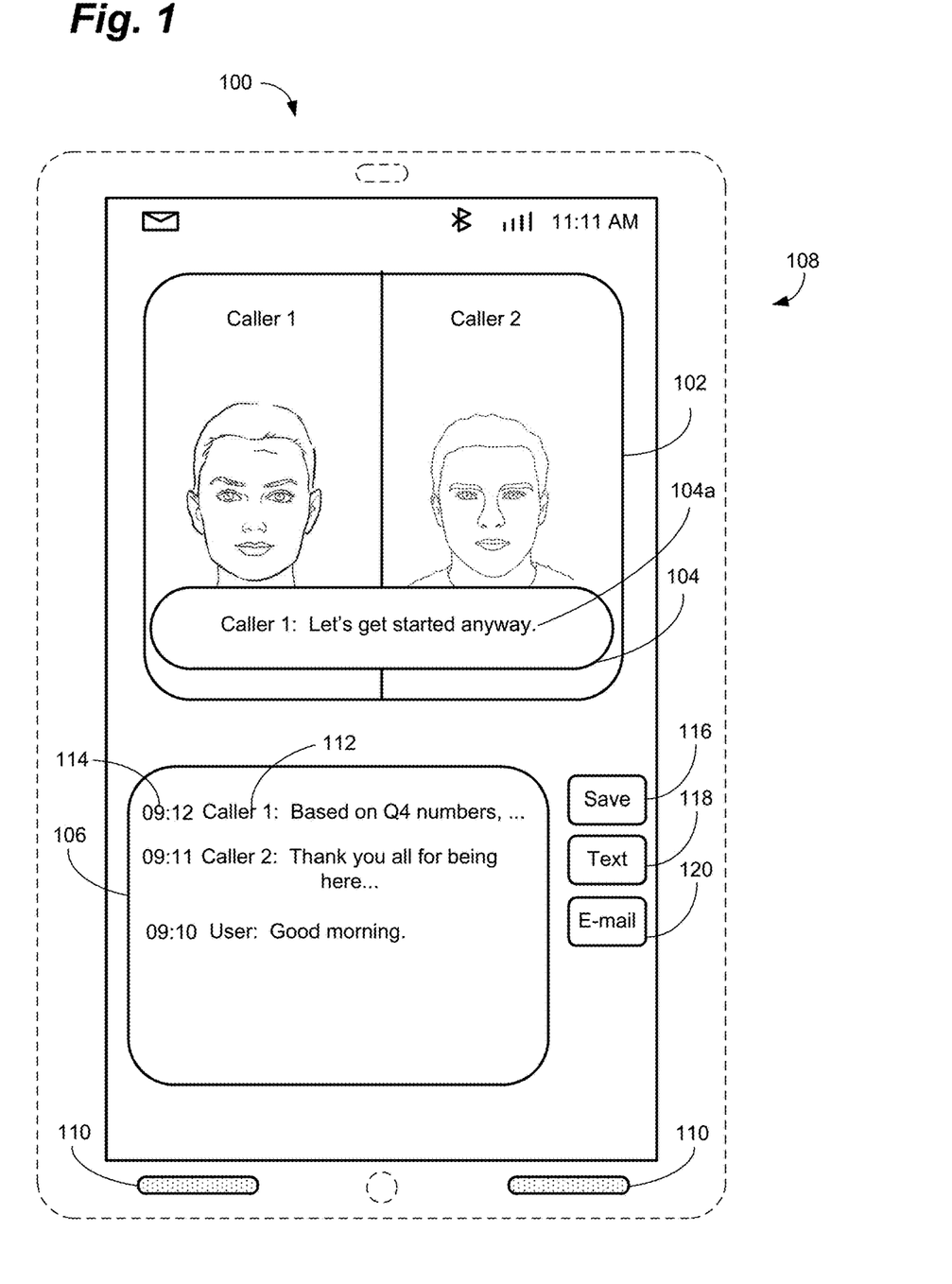
FIG. 1 depicts a system for video calls including subtitles and a call log, in accordance with some examples of the present disclosure.

As shown in FIG. 1, therefore, examples of the present disclosure can comprise a system 100, including a GUI, for use with video calls. The system 100 can include a video window 102 to display the video portion of the call (i.e., where some or all of the participants on the call are displayed). In some examples, the system 100 can also include a subtitle window 104 to display subtitles for the audio portion of the call. In some examples, the system 100 can also include a call log 106 to display one or more previous lines of subtitles.

As the name implies, a video call includes both an audio and a video component which is provided to each participant on the call. In this case, the video call shown is between a user (or, rather the user's UE 108), Caller 1, and Caller 2. As a result, Caller 1 and Caller 2 are displayed in the video window 102 of the system 100. Depending on the type and quality of the connection and the availability of bandwidth, the image can be constant video, for example, or periodically updated still images.

In some examples, as shown, both Caller 1 and Caller 2 can be displayed in the video window 102. If additional participants are in a particular call, for example, the video window 102 can be further subdivided. In other examples, only the participant on the call that is currently speaking, or has most recently spoken, can be displayed in the video window 102. In this configuration, the video window 102 can switch back and forth between participants as they speak.

Under normal circumstances, the video call also includes an audio component. On UEs 108, for example, the audio component can be provided over speakers 110 on the UE 108, for example, or via headphones or earbuds. As discussed above, however, in some examples, the user may not be able to hear the audio over the speakers 110 of the UE 108. To this end, the system 100 can also include the subtitle window 104.

The system 100 can include a voice recognition system, which can comprise embedded software, a remote server, or a combination thereof. As the name implies, the subtitle window 104 can include subtitles for the audio portion of the call in real-time, or near real-time. Thus, as each participant speaks, a subtitle 104a of their spoken words can be translated into text and displayed in the subtitle window 104. In some examples, the UE 108 can include an application ("app") that includes voice recognition software to provide the subtitles 104a. In this manner, as the audio portion of the call is received by the UE 108, the voice recognition software can translate the audio into text (i.e., subtitles 104a) and provide the subtitles 104a via the subtitle window 104. The subtitles 104a can be speech-to-text powered. In some examples, the speech-to-text function can be embedded in the keyboard, for example, and can be turned on and off. In some examples, the subtitles 104a can be continuously on with no pause, or buffer, and sent in real time. In other examples, the subtitles 104a can be buffered and spell corrected and sent in close to real time.

In other examples, the UE 108 can utilize a cloud-based voice recognition system, similar to Siri® or Google Cloud®. In this configuration, the audio portion of the call can be sent via a Wi-Fi, cellular, or other data connection, for example, to a cloud-based voice recognition system. The audio can then be translated from audio to text by cloud-based servers, and the text can be sent to each UE 108 for display in the subtitle window 104. Regardless, providing the subtitle window 104 can enable the user to see the translated version of the audio—e.g., what Caller 1 is saying—on screen, obviating the need for the user to be able to hear the audio portion of the video call. In still other examples, the UE 108 can utilize a speech-to-text service provided by the operating system (OS) and/or embedded in the native keyboard or a third party keyboard.

In some examples, the subtitle window 104 can be turned on and off as needed. In other words, some participants on the call may not need the subtitles 104a and may even find them distracting. Caller 1, for example, may be able to hear the audio and see the video and prefer the more direct communication provided thereby, while the user may be temporarily or permanently unable to hear. Thus, the user may require the subtitle window 104 until their hearing recovers, for example.

In some examples, the system 100 can also include a call log 106. The call log 106 can display one or more lines of previous subtitles 104a from the audio of the call. This may be useful regardless of whether the user has any current disabilities. The user may simply have missed a portion of what Caller 1 said because they were temporarily distracted or could not hear (e.g., due to a passing police siren). In this scenario, even if the user is not relying solely on the subtitles 104a, the user can simply review the call log 106. The call log 106 can also enable the participants to refer back to previous portions of the conversation, which may reduce questions and rehashing, for example. In addition, as discussed below, the call log 106 can also be saved or sent to others for reference.

In some examples, the video call can include multiple callers. As a result, in some examples, the call log 106 can provide an identifier 112 for each caller. In this case, the user is on a video call with Caller 1 and Caller 2. Thus, subtitles 104a from the user, Caller 1, and Caller 2 appear in the call log 106 and are labeled with an identifier 112. In this manner, the user is able to follow who is speaking, in what order, and, in some case, to whom they are speaking (e.g., when they are answering a question from another participant).

In some examples, in addition to providing the identifiers 112, the call log 106 can also include a timestamp 114 for each entry. This can enable the user to follow the conversation chronologically. In some examples, this can enable the user to better follow the conversation, even though they may not be able to hear the audio portion. In other words, because the call log 106 presents the conversation from each participant textually and in chronological order, the user can easily read along and follow the conversation.

In some examples, some, or all, of the call log 106 can be stored in the memory of the UE 108 (or stored online) for later use. To this end, in some examples, the system 100 can also include a save control 116. This can enable the user to save some, or all, of the call log 106 for the current call for future reference and use. In some examples, the user can select a portion of the call log (e.g., highlight a portion on the screen of the UE 108) and select the save control 116 to save a portion of the call log 106. In other examples, the user can simply select the save control 116 and the system 100 can automatically save a copy of the call log 106 for the entirety of the call. In this manner, the user can accurately document the call and can refer back to the call log 106 using the timestamps 114, among other things.

Similarly, in some examples, the system 100 can include a text control 118 and/or an e-mail control 120. These controls 118, 120 can enable the user to text or email some, or all, of the call log 106 to themselves and others. As before, in some examples, the user can select a portion of the call log (e.g., highlight a portion) and select the text control 118 or an e-mail control 120 to text or e-mail, respectively, a portion of the call log 106. In other examples, the user can simply select the text control 118 or an e-mail control 120 and the system 100 can automatically text or e-mail a copy of the call log 106 for the entirety of the call at the conclusion of the call.

Figure 2:
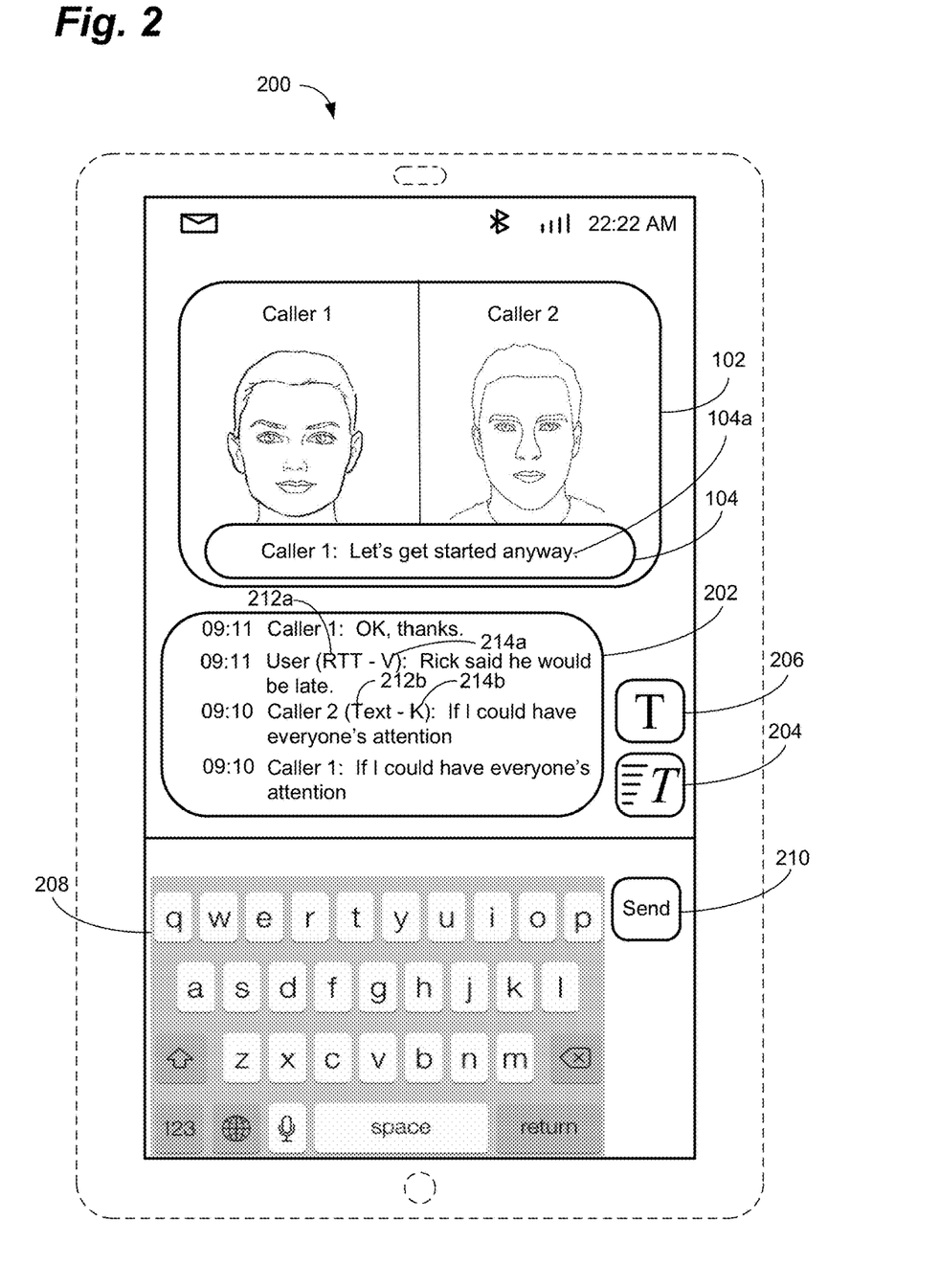
FIG. 2 depicts a system for video calls including subtitles and a public text interface, in accordance with some examples of the present disclosure.

As shown in FIG. 2, similar to the above-mentioned system 100, the video window 102 can provide video of one or more callers on the video call and the subtitle window 104 can provide subtitles 104a for the person currently (or most recently) speaking on the video call. In some examples, however, rather than merely providing a call log 106, as discussed above, the system 200, which can include a GUI, can also provide a public text interface 202. The public text interface 202 can provide at least two functions. The first function is to provide a text-based record of the call, similar to the call log 106 discussed above, which provides a text translation of the conversation for all participants in a chronological list.

The second function is to enable participants to communicate simultaneously using RTT or text messaging. In other words, in addition to providing a running log of the call, the public text interface 202 can also enable the user and other callers to communicate with the other participants using text messaging (e.g., standard text messaging or RTT). In some examples, therefore, the system 200 can include an RTT control 204 to enable the user to access RTT and/or a text control 206 to enable the user to access text messaging.

RTT enables text messages to be sent over the existing voice connection, along with the video and audio, in real-time, or nearly real-time. Thus, generally as the user types, the individual letters can appear in the public text interface 202 at approximately the same time on all users' UEs, including the user's UE 108. Thus, the user can essentially participate by text in the call in real-time.

In some examples, however, this may be disruptive to the conversation. In other words, if the user types three letters, and then someone else speaks, and then the user enters three more letters, the actual RTT message may become undecipherable because small portions of the RTT are interspersed with subtitles 104a from the call in the public text interface 202. To this end, in some examples, the system 200 may hold the RTT until it is complete to avoid partial comments appearing in the public text interface 202. In other words, despite using RTT, which is capable of sending the message as it is typed, the message can be held in a buffer until the user selects the RTT control again 204 (or the send control 210, discussed below) indicating they have finished typing their message. In some examples, the RTT can utilize a "text string mode," or "buffered mode." In this configuration, the system 200 waits for a button press (e.g., the RTT control 204) and then sends the entire message at the same time. Thus, while this configuration behaves more like a standard text massage, it still utilizes the same connection as the video call.

Standard text messaging, on the other hand, which may be sent over a separate data connection, can enable text messages to be sent when complete. This may be more conducive to the public text interface 202 format, as it sends the whole message at the same time, rather than letter by letter. Thus, the user can select the text control 206, type a message on the keyboard 208, and then select the text control 206 again (or a send control 210) to send the message over a parallel data connection. Either way, the RTT control 204 and/or the text control 206 can enable the user to make a comment, ask a question, or otherwise participate in the call textually, with or without speaking. In other words, regardless of whether the user can hear or speak, the public text interface 202 can be an effective and efficient way to communicate.

Thus, the user can select the RTT control 204 and begin typing using the keyboard 208. As the user types, the entered text (or the entire text message) can appear almost instantly in the public text interface 202. In other examples, as when using standard text messaging, for example, the text can appear in the public text interface 202 when it arrives (usually within seconds of being sent). In some examples, the text can be inserted chronologically into the call log. In this manner, the text appears in the public text interface 202 substantially as it occurs, which can provide a cadence and ease of communication similar to pure speech communication.

Regardless of whether the user selects the RTT control 204 or the text control 206, the data can be carried in the same, or a separate, "data pipe" depending on what technology handles the message (e.g., circuit switched (CS), internet protocol multimedia core network subsystem (IMS), etc.). So, for example, text, RTT, video, and audio can be on different media streams (i.e., different data connections with different destination points) in the same, or different, data pipe. RTT, audio, and video, for example, are commonly implemented on the same call in the same data pipe.

In some examples, the public text interface 202 can also include one or more type identifiers 212 to identify what type of communication was used by the participant. As shown, if the participant is simply speaking and the text is appearing in the public text interface 202 by way of voice recognition, for example, this can be considered the default. In this case, no type identifier 212 is required. If the participant is communicating via text or RTT, on the other hand, the entry can be identified as such. As shown in this example, the user is communicating via RTT, as indicated by the RTT type identifier 212a. Caller 2, on the other hand, is communicating using standard text messaging, as indicated by the text type identifier 212b.

In some examples, the public text interface 202 can also include a source identifier 214. In other words, in addition to providing what type of communication was used by the participant, the system 200 can also identify how the message was inputted. Thus, as shown in FIG. 2, if the user inputted an RTT message using voice recognition (as opposed to entering it directly on the keyboard 208), then the source identifier 214 may be a "V" 214a for "voice recognition." If the user enters a text message using the keyboard 208, on the other hand, then the source identifier 214 may be a "K" 214b for "keyboard." Thus, the type identifier 212 can indicate what type of message (e.g., RTT vs. text) was entered, and the source identifier 214 can indicate how the message was inputted (e.g., voice recognition vs. keyboard). Callers may be more forgiving of errors in messages entered by voice recognition, for example, due to the known limitations of voice recognition software.

The public text interface 202 can enable the user to communicate with other callers in real-time, or near real-time, non-verbally. This may be useful during a seminar, for example, to enable the user to ask a question without interrupting the speaker. As mentioned above, this can also enable a user that is unable to speak due to an injury, illness, or oral surgery, for example, to nonetheless participate in the video call. Rather than speaking, therefore, the user can simply communicate via text, with the text appearing in the public text interface 202 as part of the conversation.

It should be noted that, because the text is displayed in the public text interface 202, it is unnecessary for the user to select a recipient. In other words, the text can simply be displayed chronologically to all participants on the call. Thus, the user can simply select the RTT control 204 or the text control 206 and type a message without the need to select a recipient. When the user types a message and hits the send control 210, for example, the message simply appears in the public text interface 202 for all users to see. In other examples, as discussed below with reference to FIG. 3, the system 300 can instead enable the user to select a specific recipient to text with privately.

Figure 3:
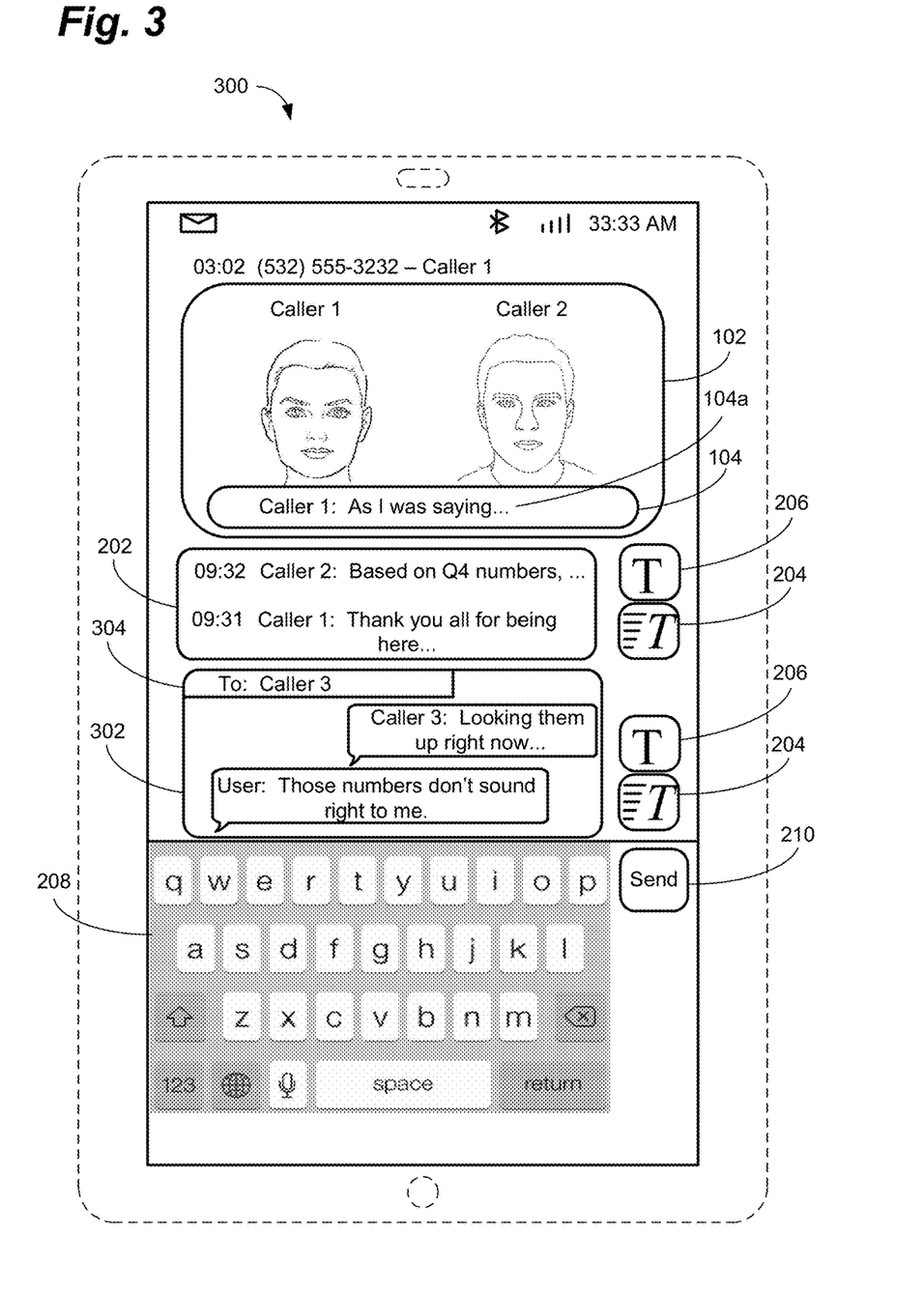
FIG. 3 depicts a system for video calls including subtitles, a public text interface, and a private text interface, in accordance with some examples of the present disclosure.

As shown in FIG. 3, in still other examples, the system 300, which can include a GUI, can also enable the user to communicate with one or more participants on the call privately using text or RTT. In other words, as before, the system 300 can include the video window 102, subtitle window 104, and either the call log 106 or public text interface 202 (shown). In addition, in some examples, the system 300 can also include a private text interface 302.

The private text interface 302 can enable the user to communicate privately via text or RTT with another participant on the call (e.g., Caller 3 in this case) or another person not on the call (i.e., the user can communicate with anyone with connectivity and is not limited to those on the call). In this manner, if the user has a question or comment that he does not wish to share with all of the participants on the call, he can contact another person directly and privately. Thus, in this example, while all callers can see the video window 102, subtitle window 104, and the public text interface 202, for example, only the user and Caller 3 can see the private text interface 302. As a result, the user and Caller 3 can communicate privately and without disturbing or interrupting the video call. Their text communications may also not appear in the public text interface 202.

To affect this, the private text interface 302 can include an address bar 304 to enable the user to select the desired participant (e.g., Caller 3). In other words, rather than appearing in the public text interface 202 for all users to see (as above), in this configuration, the text only appears on the UE associated with Caller 3. Thus, the user can select the RTT control 204 or text control 206 associated with the private text interface 302, for example, enter a recipient in the address bar 304, type a message using the keyboard 208, and communicate directly with Caller 3.

As before, if the user selects the RTT control 204, as the user types (or substantially so), the message appears in the private text interface 302 for Caller 3. This can provide substantially real-time communication between the user and Caller 3 outside the video call, but without disconnecting or otherwise interrupting the video call. In some examples, the RTT can be carried over the same connection used to provide the video call. Similarly, the user can select the text control 206 and communicate with Caller 3 using conventional text messaging (e.g., sending the whole message at once), which may be over the same connection or a separate, parallel connection. In either case, the system 300 can again include the send control 210 to enable the user to send the RTT message when complete. In this case, because the communication only uses text, and only includes the user and Caller 3, RTT may be more appropriate. In other words, RTT can enable the user and Caller 3 to communicate in real-time in a more efficient manner.

In some examples, as shown, the system 300 can include an RTT control 204 and a text control 206 for both the public text interface 202 and the private text interface 302. In this manner, the user can choose which method of communication he would like to access during the call. Selecting the RTT control 204 and the text control 206 associated with the public text interface 202, for example, enables the user to place comments and questions in the public text interface 202 for all participants to see. This can be useful when contributing to the discussion, asking a question, or other times when public questions or comments are appropriate. Selecting the RTT control 204 or the text control 206 associated with the private text interface 302, on the other hand, can enable the user to communicate directly with any one of the participants on the call privately or, indeed, with anyone (i.e., the user can communicate with anyone he would normally be able to communicate with, not just the participants on the call).

Figure 4:
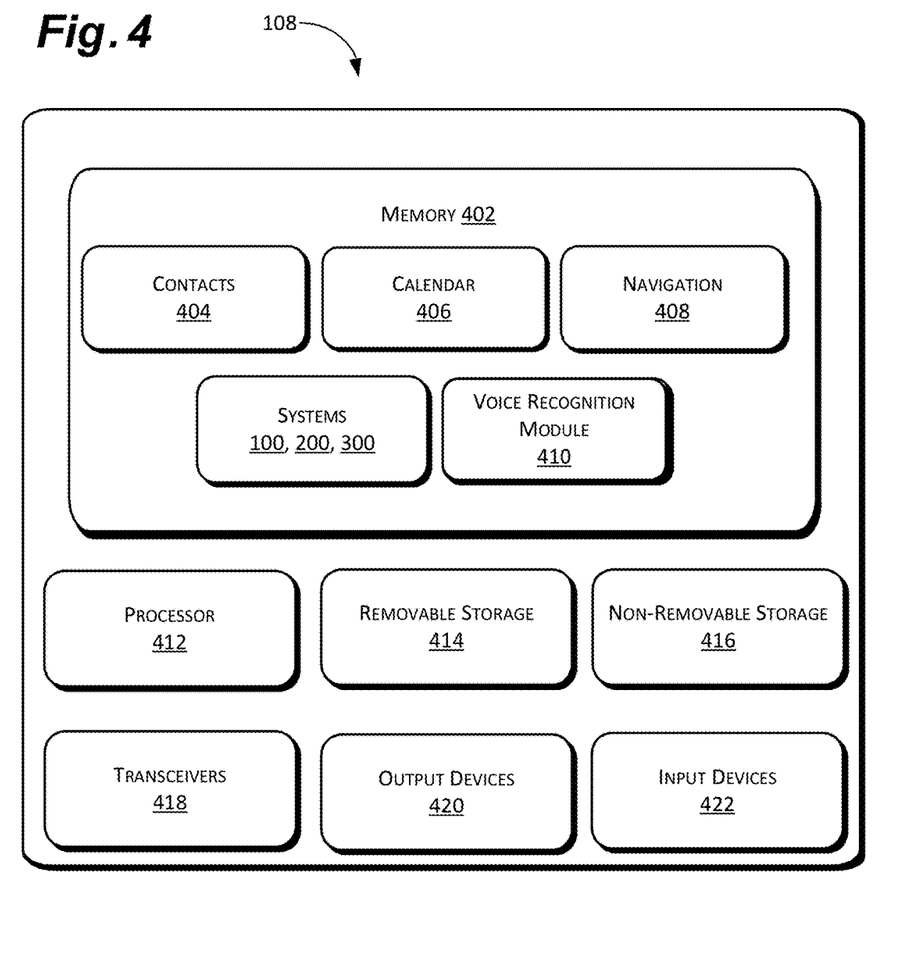
FIG. 4 is a component level schematic for a user equipment (UE) for use with the system of FIGS. 1-3, in accordance with some examples of the present disclosure.

As shown in FIG. 4, any or all of the systems 100, 200, 300 can be implemented on a variety of electronic devices, such as cell phones, smart phones, tablet computers, and laptops (collectively UE 108). The UE 108 can comprise a number of components to enable the systems 100, 200, 300, among other things, to perform the above-mentioned functions. As discussed below, the UE 108 can comprise memory 402 including many common features such as, for example, the user's contacts 404, calendar 406, and navigation software 408. In addition, the memory 402 can also include the systems 100, 200, 300 described above.

In some examples, the UE 108 can also include a voice recognition module 410. The voice recognition module 410 can include software used to convert voice to text, similar to Siri® or Dragon® Naturally Speaking. In other examples, as discussed below with reference to FIG. 5, voice recognition can be handled by a remote server in communication with the UE 108.

The UE 108 can also include one or more processor(s) 412, removable storage 414, non-removable storage 416, transceiver(s) 418, output device(s) 420, and input device(s) 422. In some examples, some or all of the functions associated with the systems 100, 200, 300 can also be handled by a remote server, such as the remote voice recognition server (VRS) 558 (discussed below with respect to FIG. 5), or other remote network entity.

In various implementations, the memory 402 can be volatile (such as random access memory (RAM)), non-volatile (such as read only memory (ROM), flash memory, etc.), or some combination of the two. The memory 402 can include all, or part, of the systems 100, 200, 300, the voice recognition module 410, and the OS for the UE 108, among other things.

The memory 402 can also comprise contacts 404. The contacts 404 can include names, numbers, addresses, and other information about the user's business and personal acquaintances, among other things. In some examples, the memory 402 can also include a calendar 406, or other software, to enable the user to track appointments and calls, schedule meetings, and provide similar functions. In some examples, the memory 402 can also comprise navigation software 408 such as global positioning system (GPS) and/or cellular location based navigation systems. Of course, the memory 402 can also include other software such as, for example, e-mail, text messaging, social media, and utilities (e.g., calculators, clocks, compasses, etc.).

The UE 108 may also include additional data storage devices (removable and/or non-removable) such as, for example, magnetic disks, optical disks, or tape. Such additional storage is illustrated in FIG. 4 by removable storage 414 and non-removable storage 416. The removable storage 414 and non-removable storage 416 can store the various programs 404, 406, 408, 410 and systems 100, 200, 300. This can enable the UE 108 to be fully or partially configured and to enable the systems 100, 200, 300 to present welcome screens, setup menus, GUIs, and other functions to the user via the systems 100, 200, 300, OS, and other programs and functions.

Non-transitory computer-readable media may include volatile and nonvolatile, removable and non-removable tangible, physical media implemented in technology for storage of information, such as computer readable instructions, data structures, program modules, or other data. The memory 402, removable storage 414, and non-removable storage 416 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UE 108. Any such non-transitory computer-readable media may be part of the UE 108 or may be a separate database, databank, remote server, or cloud-based server.

In some implementations, the transceiver(s) 418 include any sort of transceivers known in the art. In some examples, the transceiver(s) 418 can include wireless modem(s) to facilitate wireless connectivity with the other UEs, the Internet, and/or an intranet via a cellular connection. Further, the transceiver(s) 418 may include a radio transceiver that performs the function of transmitting and receiving radio frequency communications via an antenna (e.g., WiFi or Bluetooth®). In other examples, the transceiver(s) 418 may include wired communication components, such as a wired modem or Ethernet port, for communicating with the other UEs or the provider's Internet-based network.

In some implementations, the output device(s) 420 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the UE 108 is connected to a network, the type of call being received (e.g., video calls vs. voice calls), the number of active calls, etc. Output device(s) 420 also include ports for one or more peripheral devices, such as headphones, peripheral speakers, or a peripheral display.

In various implementations, input device(s) 422 include any sort of input devices known in the art. For example, the input device(s) 422 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 5:
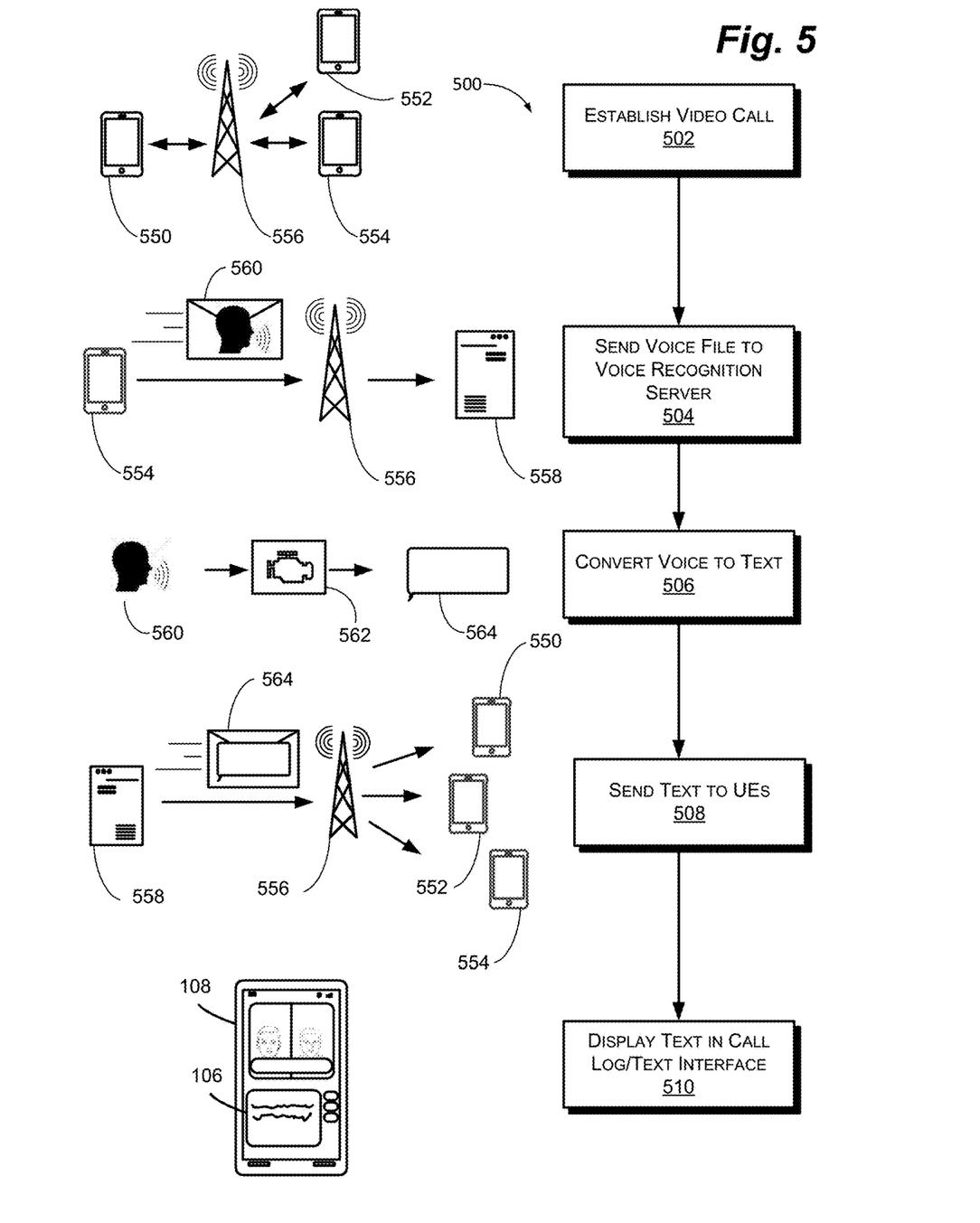
FIG. 5 is a flowchart of an example method to convert voice to text for video call subtitling, in accordance with some examples of the present disclosure.

As shown in FIG. 5, examples of the present disclosure can also comprise a method 500 for providing subtitles during a video call. As shown, the method 500 can use cloud based voice recognition software to provide subtitles in real-time, or near real-time. Of course, as discussed above, the method 500 could use voice recognition software installed on one or more of the UEs 108, 552, 554 connected to the video call. In still other examples, the method 500 could use a combination of a remote server and embedded software.

At 502, the user and one or more callers can establish a video call using appropriate software, such as an app, on each participant's UE. In this case, the user can contact the UE of Caller 1 552 and the UE of Caller 2 554 using the user's UE 108 over a cellular data connection via a cell tower 556. Of course, the call could also be conducted using a wired or wireless internet connection, or any other suitable connection.

At 504, during the video call, audio file 560 from each participant (in this case, the user's UE 108, Caller 1 552, and Caller 2 554) can be sent via the cell tower 556 to the VRS 558. The audio file 560 can be a digital signal sent as a digital file (e.g., .WAV or .MP3), for example, or sent as discrete data packets. The audio can be sent in real-time or periodically (e.g., every 1, 2, or 3 seconds) to maintain the call log 106 or public text interface 202, as applicable. In some examples, during the video call, as each participant speaks, the respective UE 108 associated with each participant can send the audio file 560 to the VRS 558. In other examples, a single participant (e.g., the person who establishes the call) can act as the call "leader" and the audio file 560 for all participants can be sent from the leader's UE (e.g., user's UE 108)

The VRS 558 can be a computer, a server, or a bank of servers in communication with the cellular network via the cell tower 556, the Internet, or other channels. In some examples, the VRS 558 can be a component of the cellular or wireless network. The VRS 558 can be provided by, for example, the network provider for the video call. In other examples, the VRS 558 can be a separate component connected to the cellular or wireless network (e.g., provided by a third-party service). In still other examples, the VRS 558 can be a cloud based server, similar to Siri® or Google Cloud®, connected to the video call via the wireless or cellular connection.

At 506, the VRS 558 can process the audio file 560, or portion thereof, using a voice recognition engine 562. The voice recognition engine 562 can convert the audio file 560 and convert it to a text file 564 suitable for display on the UEs 108, 552, 554. As before, this can be done in real time as the VRS 558 receives the data packets or can be done periodically (e.g., every 1, 2, or 3 seconds), depending on how the audio data is sent. In some examples, the system 100 may detect a pause between speakers to send the audio file 560, for example, or send the audio data at predetermined time intervals.

At 508, the VRS 558 can send the text file 564 to each of the participants' UE, the user's UE 108, Caller 1 552, and Caller 2 554. In some examples, the VRS 558 may send the text file 564 on to those participants who have selected to receive subtitles 104a (i.e., some users may turn this feature off). At 510, the app on each UE 108, 552, 554 can update the call log 106 (shown) or public text interface 202, as applicable (i.e., depending on which system 100, 200, 300 is employed), to display the text, with the timestamp 114 and identifier 112. In some examples, the timestamp 114 and identifier 112 can be derived from the original audio file 560, for example. In other examples, the app on each participants' UE 108, 552, 554 can provider time and username information.

The text file 564 can enable the participants to review, save, and share (e.g., text or e-mail) the call log 106 or public text interface 202, as well as participate in the call non-verbally. If the user is hearing impaired, for example, the user can nonetheless participate in the video call and read the call log 106 as the call progresses. The user and callers can also see each other, which may be useful to reassure family members, among other things. In some examples, as discussed above, the user can also communicate on the call using the public text interface 202. In this manner, although the user is unable to speak, he can nonetheless be seen and communicate with the other callers.

While several possible examples are disclosed above, examples of the present disclosure are not so limited. For instance, while a systems and methods for use with various electronic equipment has been disclosed, the system could be used on electronic equipment not mentioned, or other types of equipment without departing from the spirit of the disclosure. In addition, the location and configuration used for various features of examples of the present disclosure such as, for example, the order of steps, or the features included with each system 100, 200, 300 can be varied according to a particular device, touchscreen, or OS that requires a slight variation due to, for example, the size or construction of the device, display, camera, power or battery constraints, or accessibility concerns. Such changes are intended to be embraced within the scope of this disclosure.

The specific configurations, method steps, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A user equipment (UE) comprising:
    a display to display a graphical user interface (GUI) comprising at least a video window, a subtitle window, and a call log for displaying text that previously appeared in the subtitle window and for displaying textual communications between users;
    one or more input devices to receive inputs from a user;
    one or more transceivers to send and receive one or more wireless transmissions;
    one or more processors in communication with at least the display, the one or more transceivers, and the one or more input devices; and
    memory storing computer-executable instructions that, when executed, cause the one or more processors to:
        receive, at the one or more transceivers, a video call from a caller's UE;
        send, with the one or more transceivers, a first audio file to a voice recognition server (VRS), the first audio file containing data related to a first part of an audio portion of the video call;
        receive, with the one or more transceivers, a first text file from the VRS, the first text file comprising text data related to the first part of the audio portion of the video call;
        display, on the display, the text related to the first part of the audio portion of the video call in the subtitle window of the GUI;
        receive, from the one or more input devices, a plurality of alphanumeric characters, symbols, or both from the user; the plurality of alphanumeric characters, symbols, or both constituting a textual message for communication between users; and
        display, in the call log of the GUI of the display, a type identifier indicating a type of textual communication.

2. The UE of claim 1, wherein the computer-executable instructions further cause the one or more processors to:
    send, with the one or more transceivers, a second audio file to the voice recognition server (VRS), the second audio file containing data related to a second part of the audio portion of the video call;
    receive, with the one or more transceivers, a second text file from the VRS, the second text file comprising text data related to the second part of the audio portion of the video call;
    display, on the display, text related to the second part of the audio portion of the video call in the subtitle window of the GUI; and
    display, on the display, text related to the first part of the audio portion of the video call in the call log of the GUI.

3. The UE of claim 2, wherein the computer-executable instructions further cause the one or more processors to:
    send, with the one or more transceivers, a third audio file to the voice recognition server (VRS), the third audio file containing data related to a third part of the audio portion of the video call;
    receive, with the one or more transceivers, a third text file from the VRS, the third text file comprising text data related to the third part of the audio portion of the video call;
    display, on the display, text related to the third part of the audio portion of the video call in the subtitle window of the GUI; and
    display, on the display, text related to the first part and the second part of the audio portion of the video call in the call log of the GUI.

4. The UE of claim 1, wherein the computer-executable instructions further cause the one or more processors to:
    receive, from the one or more input devices, a selection by the user of a real-time text (RTT) control; and
    display, on the display, the plurality of alphanumeric characters, symbols, or both in the call log of the GUI as the user inputs the plurality of alphanumeric characters, symbols, or both.

5. The UE of claim 1, wherein the computer-executable instructions further cause the one or more processors to:
    receive, from the one or more input devices, a selection by the user of a text control;
    receive, from the one or more input devices, a selection by the user of a send control; and
    display, on the display, the plurality of alphanumeric characters, symbols, or both in the call log of the GUI.

6. The UE of claim 1, wherein the type identifier indicates that the plurality of alphanumeric characters, symbols, or both were received via text message or via real-time text (RTT).

7. A method comprising:
    receiving, at a voice recognition server (VRS), a request from a first user equipment (UE) to receive text data associated with an audio portion of a video call;

receiving, at the VRS, a first audio file from a transceiver of the first UE, the first audio file comprising a first part of the audio portion of the video call between at least the first UE and a second UE;

processing the first part of the audio portion with a voice recognition engine on the VRS to generate a first text file and an identifier, the first text file containing text data associated with the first part of the audio portion, the identifier indicative of a caller associated with the first part of the audio portion; and sending the first text file and the identifier from the VRS to the first UE;

wherein the first text file causes a display of the first UE to display text related to the first part of the audio portion of the video call and the identifier causes the display of the first UE to display the identifier on a call log of the first UE, wherein the voice recognition server is remote from the first UE and the second UE.

8. The method of claim 7, further comprising:
sending the first text file from the VRS to the second UE;
wherein the first text file causes a display of the second UE to display text related to the first part of the audio portion.

9. The method of claim 7, further comprising:
receiving, at the VRS, a second audio file from a transceiver of the second UE, the second audio file comprising a second part of the audio portion of the video call between at least the first UE and the second UE;
processing the second part of the audio portion with a voice recognition engine on the VRS to generate a second text file, the second text file containing text data associated with the second part of the audio portion; and
sending the second text file from the VRS to the first UE;
wherein the second text file causes a display of the first UE to display text related to the second part of the audio portion of the video call.

10. The method of claim 9, further comprising:
sending the second text file from the VRS to the second UE;
wherein the first text file causes a display of the second UE to display text related to the second part of the audio portion of the video call.

11. The method of claim 7, further comprising:
receiving, at the VRS, a third audio file from a transceiver of a third UE, the third audio file comprising a third part of the audio portion of the video call;
processing the third part of the audio portion with the voice recognition engine on the VRS to generate a third text file, the third text file containing text data associated with the third part of the audio portion; and
sending the third text file from the VRS to the first UE;
wherein the third text file causes a display of the first UE to display text related to the third part of the audio portion of the video call; and
wherein the video call is between at least the first UE, the second UE, and the third UE.

12. The method of claim 11, further comprising:
sending the third text file to the second UE;
wherein the third text file causes a display of the second UE and the third UE to display text related to the third part of the audio portion of the video call.

13. A user equipment (UE) for communicating a video call between a user and one or more additional users participating in the video call, each user associated with a UE, the UE comprising:

a display to display a graphical user interface (GUI), the GUI comprising:
a video window to display a video portion of a video call;
a subtitle window to display subtitles of an audio portion of the video call;
a public text interface to provide public textual message communication between a user and each additional user participating in the video call;
a call log to display the audio portion of the video call in text form, to display a textual message communicated in the public text interface, and to display a type identifier indicating a type of textual message communication between users participating in the video call; and
a private text interface to provide text messaging between the user and a selected user participating in the video call;
one or more transceivers to send and receive one or more wireless transmissions;
one or more input devices to receive inputs from the user;
one or more processors in communication with at least the display, the one or more transceivers, and the one or input devices; and
memory storing computer-executable instructions that, when executed, cause the one or more processors to:
receive, at the one or more transceivers, a video call from a caller's UE;
send a first audio file to a voice recognition system, the first audio file containing data related to a first part of the audio portion of the video call;
receive a first text file from the voice recognition system, the first text file comprising text data related to the first part of the audio portion;
display, in the subtitle window, text related to the first part of the audio portion of the video call;
display, in the call log, a previous part of the audio portion of the video call, the previous part occurring before the first part;
receive, from the one or more input devices, a plurality of alphanumeric characters, symbols, or both from the user; the plurality of alphanumeric characters, symbols, or both constituting a textual message for communication between the users; and
display, in the call log of the GUI of the display, a type identifier indicating a type of textual communication;
wherein the voice recognition system converts the audio portion of the video call into subtitles.

14. The UE of claim 13, wherein the computer-executable instructions further cause the one or more processors to:
receive, from the one or more input devices, a selection by the user of a real-time text (RTT) control associated with the public text interface; and
display, on the display, the plurality of alphanumeric characters, symbols, or both in the call log of the GUI as the user inputs the plurality of alphanumeric characters, symbols, or both.

15. The UE of claim 14, wherein the type identifier indicates that the plurality of alphanumeric characters, symbols, or both were received via RTT or text message.

16. The UE of claim 13, wherein the computer-executable instructions further cause the one or more processors to:
receive, from the one or more input devices, a selection by the user of a text control associated with the public text interface;

receive, from the one or more input devices, a selection by the user of a send control; and display, on the display, the plurality of alphanumeric characters, symbols, or both in the call log of the GUI.

17. The UE of claim 16, wherein the computer-executable instructions further cause the one or more processors to:

display, on the display, a type identifier along with the plurality of alphanumeric characters, symbols, or both in the call log of the GUI to indicate the plurality of alphanumeric characters, symbols, or both were received via text message or via RTT.

18. The UE of claim 13, wherein the computer-executable instructions further cause the one or more processors to:

receive, from the one or more input devices, a selection by the user of a real-time text (RTT) control associated with the private text interface;

receive, from the one or more input devices, a selection by the user of an address associated with the UE of a first participant on the video call; and display, only on the display of the first participant's UE, the plurality of alphanumeric characters, symbols, or both in the private text interface of the GUI as the user inputs the plurality of alphanumeric characters, symbols, or both.

19. The UE of claim 13, wherein the computer-executable instructions further cause the one or more processors to:

receive, from the one or more input devices, a selection by the user of a text control associated with the private text interface;

receive, from the one or more input devices, a selection by the user of a send control; and display, on the display, the plurality of alphanumeric characters, symbols, or both in the private text interface of the GUI.

20. The UE of claim 13, wherein the voice recognition system comprises a remote voice recognition server (VRS), wherein the computer-executable instructions further cause the one or more processors to:

send the first audio file, with the one or more transceivers, to the VRS; and receive, with the one or more transceivers, the first text file from the VRS.

21. The UE of claim 13, wherein the voice recognition system comprises a voice recognition module stored in the memory of the UE.

\* \* \* \* \*